3,223,666
POLYESTER USING BENZENE TRIBASIC ACID
Benjamin A. Bolton, Gary, Ind., assignor to Standard Oil Company, Chicago, Ill., a corporation of Indiana
No Drawing. Filed Sept. 13, 1962, Ser. No. 223,538
19 Claims. (Cl. 260—29.2)

This is a continuation-in-part of my co-pending application Serial No. 762,254 filed September 22, 1958, and entitled "Polyester Using Benzene Tribasic Acid," now abandoned.

This invention relates to polyester resins characterized by thermosetting properties.

An object of the invention is a thermosetting polyester resin derived from benzene tribasic acids, aliphatic dicarboxylic acids, and aliphatic polyols. A particular object is a water soluble thermosetting polyester resin derived from benzene tribasic acids, alkandioic acids and glycols. Still another object is a water soluble polyester resin suitable for use as an air-baked surface coating agent, and solutions for such use. A further object is a high gloss producing surface coating from a water soluble resin. Other objects will become apparent in the course of the description of the invention.

POLYESTER PRODUCT

The polyester condensation reaction product of the invention is prepared by condensing an aliphatic polyol, an aliphatic dicarboxylic acid containing at least 4 carbon atoms, and a benzene tribasic acid at elevated temperatures, for example, about 300°–400° F., while continuously removing the water formed in the reaction. The polyester condensation reaction is well known and it is not necessary to describe it in detail herein. The benzene tribasic acids and anhydrides may also be described as acidic members selected from the class consisting of benzene tricarboxylic acids containing, as the only substituents, 3 carboxyl groups and anhydrides thereof. The individual members of the defined class of benzene tribasic acids are trimellitic acid, trimellitic anhydride, trimesic acid, hemimellitic acid and hemimellitic anhydride. Trimellitic anhydride and trimesic acid are the preferred acidic members.

The reaction requires the presence of an aliphatic polyol containing two or more hydroxy groups. Any of the well-known aliphatic polyols may be used such as alkylene glycols (including the ether glycols), glycerol, tetrahydroxy alcohols, and hexahydroxy alcohols. Examples of suitable aliphatic polyols are ethylene glycol, propylene glycol, hexamethylene glycol, diethylene glycol, triethylene glycol, glycerol, trimethylol-ethane, trimethylol - propane, erythritol, pentaerythritol, dipentaerythritol, mannitol, and sorbitol. The preferred polyols are the alkylene glycols, especially the lower glycols (containing 12 or less carbon atoms) and particularly propylene glycol and neopentyl glycol.

The reaction requires the presence of an aliphatic dicarboxylic acid containing at least 4 carbon atoms. Examples of suitable acids are succinic, glutaric, adipic, suberic, sebacic, maleic, itaconic, 1,6-hexene-3-dioic, linoleic-dimer, hexadecanedioic, eicosanedioic, hexacosanedioic and tetratriacontanedioic. The alkandioic acids containing from 4 to about 20 carbon atoms are preferred and especially adipic acid.

In addition to the defined benzene tribasic acids, the defined aliphatic dicarboxylic acids and the defined aliphatic polyols, the polyester condensation reaction product may include an aliphatic monohydroxy alcohol and/or a monocarboxylic acid. The aliphatic monohydroxy alcohols include, by way of example, methyl alcohol, butyl alcohol, hexyl alcohol, stearyl alcohol, allyl alcohol, and oleyl alcohol. In addition to the individual compounds, mixtures of these monohydroxy alcohols may be used, e.g., the mixtures obtained from the oxoation of a mixture of olefins. Such mixtures of Oxo alcohols are now available commercially and are known as isooctyl alcohol, nonyl alcohol, isodecyl alcohol, and isotridecyl alcohol.

The monocarboxylic acid includes fatty acids, especially unsaturated fatty acids, and aromatic acids, especially benzoic acids and substituted benzoic acids. Suitable unsaturated fatty acids include safflower oil fatty acids, oiticia oil fatty acids and the like. Utilization of these and similar unsaturated fatty acids in the resin formulations generally reduces the baking time of the resin coatings.

Especially desirable aromatic monocarboxylic acids include benzoic acid and hydrocarbon substituted benzoic acids having from 1–4 carbon atoms in the substituted group such as methyl benzoic acid (preferably p-methyl benzoic acid) and butyl benzoic acid (preferably p-(t-butyl) benzoic acid). The utilization of these acids, particularly benzoic acid and the preferred para substituted acids in the formulation of the resins is very desirable in regard to reducing the hydroxyl functionality of the higher polyols and improving such properties of the resin coatings as hardness. An especially suitable acid and polyol are benzoic acid and trimethylol ethane with the resulting ester having an average of two hydroxyl groups.

The polyester condensation reaction product may be obtained by using individual benzene acids or anhydrides, individual aliphatic dicarboxylic acids or individual polyols (and individual monohydroxy alcohols or monocarboxylic acids), or a mixture of benzene tribasic acids, or acids or polyols (or monohydroxy alcohols or monocarboxylic acids).

The characteristics of the polyester condensation reaction product is dependent upon the type of reactants, and upon the mole ratios existing among the reactants. In general, the mole ratio of the defined benzene tribasic acid to the defined dicarboxylic acid to defined polyol is from about 1:1:2 to 10:1:25. Ratios of reactants outside the spelled out range may be utilized for production of resins having special properties. More usually, the mole ratio of defined benzene tribasic acid to defined dicarboxylic acid is between about 1and 5. When a glycol is used as the polyol, the preferred charge to the polyester condensation zone is calculated on the basis of about 2 moles of glycol per mole of defined benzene tribasic acid and about 1 mole of glycol per mole of defined dicarboxylic acid. This basis is illustrated by two very suitable mole ratios of benzene tribasic acid: dicarboxylic acid:glycol of 3:1:7 and 3:2:8.2. At the same ratio of reactants, the surface coatings obtainable from the resins may not be of essentially identical characteristics for different reaction systems. To illustrate: at a mole ratio of defined benzene tribasic acid:defined dicarboxylic acid:glycol of 3:1:7, the system trimellitic anhydride, adipic acid, and propylene glycol produces a harder surface coating than does the system trimellitic anhydride, adipic acid, and 1,3-butylene glycol. However, essentially the same hardness of the surface coating is obtained when the mole ratio of trimellitic anhydride: adipic acid:1,3-butylene glycol is changed to 5:1:11.

When a monohydroxy alcohol is also present, it is desirable to have a mole ratio of defined polyol to monohydroxy alcohol between 1 and 10. It is to be understood that the amount of monohydroxy alcohol may be less than this amount or more than this amount, dependent upon the desired characteristics of the final product.

When a monocarboxylic acid is present, it is generally desirable to employ mole ratios of the acid to defined polyol such that the average hydroxyl functionality of the resulting partial ester is not below about two and preferably is about two. To illustrate, a maximum of about one mole of benzoic acid would be reacted with a mole of trimethylol ethane in producing a suitable partial ester.

The polyester condensation reaction product desirably is prepared under conditions of reaction such that the resin has an acid number the lowest possible commensurate with avoiding gelation. It is to be understood that not all combinations of the defined reactants can produce an acid number as low as 20; however, in general, the acid number of the polyester product will be between about 20 and 100. The polyester products range from viscous liquids to hard solids; these materials are soluble in oxygenated solvents such as alcohols and ketones and mixtures of these with benzene hydrocarbons.

The polyester condensation reaction products range from very viscous liquids to hard solids in appearance. These polyester products possess the common characteristic of forming "rigid" solids when baked at temperatures on the order of 400° F. in the presence of oxygen or air. The degree of baking (curing) needed to obtain a thermoset material will depend upon the particular polyester product. In general, the products made from trimellitic anhydride, alkandioic acids, and lower glycols form thermoset materials at 400° F. in times ranging from 15 minutes to 1 hour. These polyester resins will cure to thermoset materials at lower temperatures, for example, 300° F., but require longer times. An outstanding characteristic of the thermoset solids derived from the polyester products of the invention is the excellent color present in the thermoset solid. Unlike the majority of the presently available commercial materials which form rigid thermoset solids, the color of the polyester product is not significantly degraded by this severe curing at about 400° F.

Another outstanding characteristic of the thermoset solids is their glossy surface appearance which makes them attractive as surface coatings for such metal products as automobiles, appliances, etc., and wood products such as furniture. An exceptional property of the solids derived from trimesic acid, and particularly those from enamels derived from trimesic acid, adipic acid, and propylene glycol is their excellent gloss retention upon exposure to severe exterior conditions.

The polyester products of the invention have utility in the broad field of rigid plastics now occupied by materials such as phenol formaldehyde resins and filled melamine-formaldehyde resins. The polyester resins may also be used as binders for laminations such as plywood forming and fiber glass reinforced plastics. In both of these uses, the polyester products of the invention are particularly good because no curing agent need be added to the product in order to obtain good rigidity or suitably short curing times.

The polyester products in themselves are excellent film-formers when dissolved in oxygenated organic solvents for use in the formation of baked surface coatings. The polyester product in solvent solution may have pigments introduced therein, in order to produce enamel finishes which possess high gloss.

For special uses, the polyester product may have incorporated therein an amino resin modifier. The amino resin modifiers may be any of the well-known melamine-formaldehyde resins and urea-formaldehyde resins. In the case of surface coating use, the presence of an amino resin modifier improves the continuity of the film laid down on the surface being coated. In general, the presence of more than a minor amount of amino resin may have an adverse effect on other characteristics of the polyester product. Usually the modified composition will consist of the polyester product and between about 0.5 and 40 weight percent and preferably between 0.5 and 20 weight percent of amino resin modifier. In the case of polyester products produced from alkandioic acids and glycols which are to be used for surface coating applications and cratering of the coating is a problem, the amino resin modifier is present preferably in an amount between about 2 and 5 weight percent.

The polyester products are soluble in the oxygenated organic solvents commonly used in the surface coating field. The better known of these solvents are alcohols such as methyl and butyl, and ketones such as acetone and methylethylketone. Also, these materials may be dissolved in the commonly used mixtures of benzene hydrocarbons such as toluene and xylene with an oxygenated organic solvent; a typical mixed solvent consists of a 60:40 volume ratio of mixed xylenes and butanol. The amino resin modified compositions are also soluble in the above described solvents.

The polyester condensation reaction is carried out in normal fashion. However, the nature of some of the reactants makes it preferable to modify the start-up procedure. It is preferred to have in the reaction zone at least one liquid reactant; the liquid reactant may be naturally liquid or liquid at the temperature of the polyester condensation reaction. In the case of a normally liquid reactant, all the reactants are charged into the reaction zone and all reactants brought to the reaction temperature simultaneously. Where all the reactants are normally solid, it is preferred to add the lowest melting reactant to the reaction zone first and produce a liquid material by raising the temperature to the melting point. Then the other reactants are introduced and the whole brought to the desired reaction temperature. Also, the reactants may be added in the order of melting point in sequence in order to have the material in the reaction zone substantially liquid at all times. When preparing a resin from a high melting acid such as trimesic acid, it is preferred to bring the acid into solution by initially reacting it with the polyol and then to add the remaining reactants and proceed with the polycondensation reaction.

WATER SOLUBLE RESIN

The water soluble polyester resin of the invention consists essentially of the resin produced by the reaction of the polyester condensation reaction product and an alkaline reacting material. The polyester product and the alkaline material are reacted until a water soluble resin is obtained. The amount of alkaline reacting material is most readily determined by following the pH of the reaction medium. An aqueous reaction medium is preferred when the water soluble resin is to be used for surface coating applications because the desired water solution is obtained immediately. When the polyester product and aqueous reaction medium are contacted in the presence of an alkaline reacting material, the polyester product passes into solution substantially completely at a pH of about 5. In practically all instances, the polyester product will be in complete solution at a pH of about 6. The use of alkaline reacting material in excess of that needed to bring all the polyester product into solution is not harmful, at least up to a water solution pH of about 9. It is preferred to have the aqueous solution somewhat on the basic side of neutral, i.e., a pH of from 7-8 for better stability.

The alkaline reacting material may be any material which reacts with acidity to produce a more neutral product. Ammonia (as the hydroxide) and alkali metal hydroxides are particularly suitable when aqueous reaction medium is desired. The hydrocarbon amines, particularly the lower molecular weight containing not more than 4 carbon atoms in each aliphatic group, are suitable. The amino aliphatic alcohols, such as ethanol amines, are suitable. The heteroamines, such as morpholine and piperidine may be used. The type of alkaline reacting material used is determined in part by the characteristics desired in the final water soluble resin; also, by the type of polyester product which is to be converted to a water soluble form. Preferred materails are aqueous ammonia, the lower molecular weight alkyl amines, such as ethylamines and butylamines, and the lower molecular weight amino alkyl alkanols such as dimethyl ethanolamine and diethyl ethanolamine.

The neutralization reaction is carried out by contacting the polyester product and the alkaline reacting medium, when necessary in the presence of a liquid reaction medium; particularly suitable reaction mediums are oxygenated organic solvents and water. When water is used as the liquid reaction medium, it is preferred that it be warm, i.e., maintained in the region of 100-160° F.; the polyester product is added to the aqueous alkaline reacting material and the two agitated until the polyester product has passed into solution. Ammonium hydroxide solution (usually containing about 28% ammonia) is a particularly suitable aqueous alkaline medium. The water solutions of the water soluble resin are clear liquids usually containing some opalescent appearance; the solutions may be colorless or colored, depending on the particular water soluble resin present.

The water soluble resin behaves in essentially the same manner as the polyester product when exposed to oxygen or air at elevated temperatures in that an air-baked or cured thermoset solid is formed. At temperatures on the order of 400° F., the water soluble resin produces hard films on metal surfaces in times of 15 minutes to 1 hour. An outstanding characteristic of the products of the invention is that the water soluble resins possess essentially the identical thermosetting properties that the water insoluble polyester product progenitors possess. Surprisingly, the films produced from the water solutions possess the very high gloss that the films produced from the solvent solutions of polyester products possess; this gloss is particularly apparent in the presence of pigments where enamel finishes are obtained. In addition, films produced from water solutions of resins derived from trimesic acid, adipic acid, and propylene glycol retain their gloss to an exceptionally high degree upon exposure to severe exterior conditions, a performance similar to that of the solvent solutions of the resin.

In addition to their high solubility, which may be as much or more than 50 percent by weight, the water soluble resins are also soluble in the ordinary oxygenated organic solvents as well as in mixtures of these with benzene hydrocarbons. Because of its cheapness and safety, water is the preferred solution for surface coating applications and also as an aqueous reaction medium.

For surface coating applications particularly, an amino resin such as melamine-formaldehyde or urea-formaldehyde, may be helpful. The water soluble amino resins are preferred. The water solution may be formed by dissolving the water soluble resin, itself, and the particular amino resin. A particularly suitable method uses a water soluble amino resin dissolved in water, as the alkaline reacting medium, for reaction with the polyester product to obtain the water soluble resin, which contains amino resin groups as an integral part of the molecule.

The water soluble resins may be modified by the addition of amino resins. The presence of minor amounts of amino resin modifiers is helpful in improving surface coating properties, but more than minor amounts impair some of the other desirable properties of the resins. In general, the modified composition consists of water soluble resin and between about 0.5 and 40 weight percent and preferably between about 0.5 and 20 weight percent of amino resin modifier. This composition, containing water soluble resin and amino resin modifier, is essentially water soluble and may be completely water soluble when water soluble amino resins are used as modifiers.

The water soluble resin may be recovered from the reaction medium and used for the preparation of thermoset solids in the same application as the polyester product may be used. For surface coating purposes, the solid water soluble resin is preferably dissolved in a sufficient amount of water to produce the desired viscosity for the particular application.

Species of polyester products and water soluble resins obtainable by the invention are illustrated by the following working examples.

*Example 1*

Trimellitic anhydride, 477 g.; adipic acid, 121 g.; and 1,3-butylene glycol, 522 g., were placed in a flask provided with a stirrer and an overhead condenser separating water from glycol. Herein the mole ratio trimellitic:adipic: glycol was 3:1:7. The reactants were raised to 352° F. and cooked for a period of 7 hours with a sparge of nitrogen gas; a total of 103 ml. of water was condensed during this time. The polyester resin product was a clear, yellowish solid having an acid number (mg. KOH/g.) of 56. The solid resin was dissolved in a 64:40 (by volume) mixture of xylene and butanol to obtain a 50% solution, i.e., 1 part by weight of resin for 2 parts by weight of solvent. The solution had a Gardner viscosity of J–K and a Gardner color of 3.

A. To the solvent solution of polyester resin, 5% by weight, based on resin solids, of melamine-formaldehyde resin was added. Films were cast on steel panels from this modified resin and baked for 30 minutes at 400° F. The coated panel was given a 180° bend around a ⅛ inch steel rod without cracking the coating. The Sward hardness of the coating was 50; an 80 inch-lbs. impact did not damage the coating.

B. The solid resin was put into water solution by heating 355 g. of resin solids and 500 g. of distilled water to about 150° F. NH$_4$OH solution (28–30% NH$_3$) was added through a burette to neutralize the acid groups on the resin and thus effect solution. The pH of the mixture was kept between 5–6 throughout the reaction. The mixture. The softening point was about 95°–110° F. essary to add more water to keep the viscosity low. The resulting solution had the following properties: appearance—clear opalescent solution; viscosity—Z–5, Z–6 Gardner; percent solids—34.0%.

The solids of this water solution was obtained for examination by heating to 100° C. and sparging with a stream of nitrogen gas. The solid product was clear with a pale yellow cast and somewhat tacky at room temperature. The softening point was about 95°–110° F.

An enamel was prepared by milling in a modified jar mill 0.9 part of rutile TiO$_2$ and 1 part of water soluble resin water solution (resin solids basis). The enamel was thinned with water and 1.5 mil dry film thickness, draw downs were made. These films were cured by baking 25 minutes at 400° F. The cured films were very glossy and had excellent physical properties. The Sward hardness of these films was 20. They were extremely tough and flexible; they passed a ⅛″ bend (180°) without cracking and had an impact resistance of over 80 inch-lbs. Films were immersed in distilled water for 72 hours at room temperature (75° F.) with absolutely no softening. When immersed in a 2% laundry detergent solution for 16 hours the films softened somewhat but regained their original properties after they were rinsed with water and allowed to remain in the air for 1 hour.

Color retention on overbake of these films is excellent. One of the cured film panels was cut in half. One of the half panels was overbaked at 400° F. for 16 hours. Visually the overbaked panel could not be detected from the panel which had undergone a normal cure cycle since gloss and color of the two panel halves were identical. The overbaked panel also maintained the excellent original physical properties of the panel which was cured normally. The overbaked panel passed a ⅛″ bend without cracking and has also been subjected to an 80 inch-lb. blow without cracking.

Example 2

Using the polyester condensation procedure of Example 1 a polyester resin was prepared from trimellitic anhydride, adipic acid and propylene glycol in a mole ratio of 3:1:7. The polyester resin had an acid number of 48. A 50% solids solution in 60/40 xylene/butanol had a Gardner viscosity of L and a Gardner color of 2.

A. A coating was placed on a steel panel from the solvent solution and baked for 20 minutes at 400° F. The coated panel passed a 180° bend on a ⅛ inch rod. The Sward hardness was 40 and an 80 inch-lbs. impact did not damage the coating.

B. Using the procedure of Example 1, the polyester resin was converted to the water soluble resin. A 1.5 mil dry thickness film on a steel panel after baking at 400° F. for 30 minutes had a Sward hardness of 40 and passed a 180° bend test (⅛ inch rod).

These results show that all the good properties of the polyester resin are carried over to the water soluble resin, and with elimination of the flammable solvent systems.

Example 3

Using the polyester condensation procedure of Example 1, a polyester resin was prepared from trimellitic anhydride, adipic acid and neopentyl glycol in a mole ratio of 3:1:7; the water soluble resin was prepared by that procedure also. Within the margin of error in the testing procedures, the baked film properties of the polyester resin and corresponding water soluble resin duplicated those of the resins using trimellitic anhydride, adipic acid and propylene glycol (Example 2).

Example 4

Trimellitic anhydride, adipic acid and 1,3-butylene glycol were condensed in a mole ratio of 5:1:11 and a water soluble resin formed under the conditions of Example 1. The film properties of the unmodified polyester resin and of the water soluble resin were essentially the same as those of the trimellitic anhydride-adipic-propylene glycol products of Example 2 and trimellitic anhydride-adipic-neopentyl glycol products of Example 3.

Example 5

Trimesic acid, 453 g.; propylene glycol, 382 g.; were placed in a flask provided with a stirrer and an overhead condenser separating water from glycol. The reactants when raised to 360° F. and cooked 2½ hours to remove 63 ml. of water with a nitrogen gas sparge. The refractive index of the overhead indicated that a slight amount of propylene glycol was in the overhead. At this point, adipic acid, 104.5 g. was added. The reaction was continued at 350° F. until 122 ml. of water was removed. The product now had an acid number of 59 and was very viscous. 20 more grams of propylene glycol was added to compensate for the propylene glycol removed overhead and the reaction was continued for 1 hour to yield a very hard, brittle, pale yellow colored resin with an acid number of 48.3. The mole ratio of trimesic acid:adipic acid:glycol was between 3:1:7 and 3:1:7.3.

A. 400 g. of the solid resin was heated to 250° F. and 400 g. of a solvent composed of 240 g. of xylene and 160 g. of n-butyl alcohol was added with stirring. This solvent solution had the following characteristics: Appearance—slightly hazy; Gardner viscosity—S–T; Gardner color—3–4; percent solid—49.7.

An enamel was prepared by mixing TiO₂ with the solvent solution of the resin in a porcelain ball mill. The proportion of TiO₂ and resin solution was adjusted to give a pigment (TiO₂) to resin solids ratio of 0.9:1 (weight). The enamel was thinned to application viscosity with xylene and applied to a metal panel by spraying. The sprayed film was allowed to air dry 15–20 minutes and then baked at 400° F. in an air circulating oven.

B. The solid resin was put into water by heating 400 g. to 200° F. and adding 100 g. of water. NH₄OH solution (28–30% NH₃) was added to give a pH of 7–8 and additional water was added to give a solution with the following characteristics: Appearance—clear; viscosity—Z–2; percent solids—24.3.

An enamel was prepared from the aqueous solution of the resin. The preparation of this enamel, its pigment to resin solids ratio (0.9:1), and the preparation of a baked coating from this enamel were the same as that described for the enamel of Example 5A.

The baked coatings of Examples 5A and 5B were exposed to external conditions near Miami, Florida, at an angle 45° facing south. This is a typical, severe exposure for automotive or other types of enamels requiring good durability. Measurements of gloss (60°) were taken with a Gardner 60 Degree Gloss Meter prior to exposure, after 6 months exposure (after washing to remove dirt) and after 12 months exposure (after washing). The results are listed in Table 1 below.

TABLE 1

| Enamel | 5A | 5B |
| --- | --- | --- |
| Initial Gloss | 82 | 67 |
| 6 Mo. Gloss | 81 | 69 |
| Gloss Retained, percent | 99 | 100 |
| 12 Mo. Gloss | 82 | 67 |
| Gloss Retained, percent | 100 | 100 |

The above results in Table 1 demonstrate that the gloss retention of coatings prepared from the resin formulated from trimesic acid, adipic acid, and propylene glycol (in an approximate mole ratio of 3:1:7) were excellent. Both coatings exhibited approximately 100% gloss retention (within the accuracy of the test) after 6 months and after 12 months exposure.

Example 6

The coatings of Example 5 were compared in gloss retention to a coating prepared from an aqueous solution of a resin formulated from trimellitic anhydride. The resin had a mole ratio of trimellitic anhydride:adipic acid:propylene glycol of 3:1:7 and its enamel was prepared in the same manner as the enamel for coating 5B.

The conditions of exposure were as described in Example 5. Table 2 lists the data for the three coatings.

TABLE 2

| Enamel | 5A | 5B | 6 |
| --- | --- | --- | --- |
| Aromatic Acid | Trimesic Acid. | Trimesic Acid. | Trimellitic Anhydride. |
| Solvent | Xylene/n-butyl alcohol. | Water. | Water. |
| Initial Gloss | 67 | 82 | 85. |
| 6 Mo. Gloss | 69 | 81 | 22. |
| Gloss Retention, percent | 100 | 99 | 26. |
| 12 Mo. Gloss | 67 | 82 | 18. |
| Gloss Retention, percent | 100 | 100 | 21. |

The results in Table 2 demonstrate that coatings prepared from resins formulated from trimesic acid, adipic acid, and propylene glycol in an approximate mole ratio of 3:1:7 retain their gloss to an exceptionally higher degree than the coating prepared from a resin formulated from trimellitic anhydride and the same other two reactants in a similar mole ratio. This unusual property is demonstrated by the 100 percent value of gloss retention for coating 5B (derived from trimesic acid) after 12 months exposure compared to the 21 percent value of gloss retention for coating 6 (derived from trimellitic anhydride).

Thus having described the invention, what is claimed is:

1. A resin consisting essentially of the polyester condensation reaction product of (a) a benzene tribasic acidic member selected from the group consisting of trimellitic acid, trimellitic anhydride, trimesic acid, hemimellitic acid and hemimellitic anhydride, (b) aliphatic dicarboxylic acids containing from 4 to about 60 carbon atoms and (c) aliphatic polyols, wherein the mole ratio acidic member:dicarboxylic acid:polyol is between about 1:1:2 and about 10:1:25, which resin is characterized by an acid number of about 20–100, by the formation of a thermoset material on baking at about 400° F. and by solubility in oxygenated organic solvents.

2. A resin consisting essentially of the polyester condensation reaction product of (1) a benzene tribasic acidic member selected from the class consisting of trimellitic acid, trimellitic anhydride, trimesic acid, hemimellitic acid and hemimellitic anhydride, (2) an alkandioic acid containing from 4 to about 20 carbon atoms, and (3) a glycol, wherein the mole ratio of tribasic acidic member:alkandioic acid:glycol is between about 1:1:2 to 10:1:25, which resin is characterized by an acid number of about 20–100, by the formation of a thermoset solid upon air-baking at a temperature on the order of 400° F. and by solubility in oxygenated organic solvents.

3. A resin consisting essentially only of the product of reacting in an inert atmosphere trimellitic anhydride, adipic acid and neopentyl glycol, the mole ratio of said reactants being about 3:1:7, at a temperature below about 360° F., while withdrawing water produced in the condensation reaction, which resin is characterized by an acid number of about 20–100, by solubility in oxygenated organic solvents and by the formation of a thermoset solid upon air-baking at a temperature on the order of 400° F.

4. A resin consisting essentially only of the product of reacting in an inert atmosphere trimesic acid, adipic acid and propylene glycol, the mole ratio of said reactants being about 3:1:7, at a temperature below about 360° F.; while withdrawing water produced in the condensation reaction, which resin is characterized by an acid number of about 20–100, by solubility in oxygenated organic solvents and by the formation of a thermoset solid upon air-baking at a temperature on the order of 400° F. which is characterized by improved gloss retention.

5. A resin consisting essentially of the resin of claim 1 reacted with an alkaline material.

6. A water-soluble resin consisting essentially of the water-soluble reaction product of (A) an alkaline material with (B) a resin consisting essentially of the polyester condensation reaction product of (a) a benzene tribasic acidic member selected from the group consisting of trimellitic acid, trimellitic anhydride, trimesic acid, hemimellitic acid and hemimellitic anhydride, (b) alphatic dicarboxylic acids containing a total of from 4 to about 60 carbon atoms and (c) aliphatic polyols, wherein the mole ratio acidic member:dicarboxylic acid:polyol is between about 1:1:2 and about 10:1:25, which resin is characterized by solubility in oxygenated organic solvents, and acid number of about 20–100 and by the formation of a thermoset material on baking at about 400° F., said water-soluble reaction product being further characterized by a water solution pH of between about 5 and 9.

7. The resin of claim 6 wherein said alkaline material is ammonia.

8. The resin of claim 6 wherein said alkaline material is a lower molecular weight alkyl amine.

9. The resin of claim 6 wherein said alkaline material is a lower molecular weight amino alkyl alkanol.

10. The resin of claim 6 wherein said acidic member is trimellitic anhydride.

11. The resin of claim 6 wherein said acidic member is trimesic acid.

12. The resin of claim 6 wherein said acid is adipic acid.

13. The resin of claim 6 wherein said polyol is propylene glycol.

14. The resin of claim 6 wherein said polyol is 1,3-butylene glycol.

15. The resin of claim 6 wherein said polyol is neopentyl glycol.

16. A liquid composition consisting essentially of the water-soluble resin of claim 6 and sufficient amount of water to dissolve said resin.

17. A water-soluble resin consisting essentially of the water-soluble reaction product of (I) an alkaline material with (II) the polyester condensation reaction product of (1) a benzene tribasic acidic member selected from the class consisting of trimellitic acid, trimellitic anhydride, trimesic acid, hemimellitic acid and hemimellitic anhydride, (2) an alkandioic acid containing from 4 to about 20 carbon atoms, and (3) a glycol, wherein the mole ratio of acidic member:alkandioic acid:glycol is between about 1:1:2 to 10:1:25, which polyester is characterized by an acid number of about 20–100, by solubility in oxygenated organic solvents and by the formation of a thermoset solid upon air-baking at a temperature on the order of 400° F., said water-soluble reaction product being characterized by a water-solution pH of between about 5 and 9.

18. A water-soluble resin consisting essentially of the water-soluble resin produced by the reaction of (I) ammonium hydroxide with (II) the product of reacting in an inert atmosphere trimellitic anhydride, adipic acid and neopentyl glycol, the mole ratio of said reactants being about 3:1:7, at a temperature below about 360° F., while withdrawing water produced in the condensation reaction, which product is characterized by an acid number of about 20–100, by solubility in oxygenated organic solvents and by the formation of a thermoset solid upon air-baking at a temperature on the order of 400° F., said water-soluble resin being characterized by a water solution pH of about 6.

19. A water-soluble resin consisting essentially of the water-soluble resin produced by the reaction of (I) ammonium hydroxide with (II) the product of reacting in an inert atmosphere trimesic acid, adipic acid and propylene glycol, the mole ratio of said reactants being about 3:1:7, at a temperature below about 360° F., while withdrawing water produced in the condensation reaction, which product is characterized by an acid number of about 20–100, by solubility in oxygenated organic solvents and by the formation of a thermoset solid upon air-baking at a temperature on the order of 400° F., which is characterized by improved gloss retention, said water-soluble resin being characterized by a water solution pH of about 7–8.

References Cited by the Examiner
UNITED STATES PATENTS 2,562,878    1/1949    Blair _____ 260—75

OTHER REFERENCES

Amoco Chemical Bulletin, "Trimellitic Anhydride," Amoco Chemicals Corp., Chicago, Ill., 32 pages (page 26 relied on).

MURRAY TILLMAN, *Primary Examiner.*